US012738700B2

(12) United States Patent
Lee et al.

(10) Patent No.: US 12,738,700 B2
(45) Date of Patent: Sep. 15, 2026

(54) BUSBAR CONNECTOR AND POWER TERMINAL WITH CABLES

(71) Applicants: BELLWETHER ELECTRONIC CORP., Taoyuan City (TW); Bellwether Electronic (Kunshan) Co., Ltd, Kunshan City (CN)

(72) Inventors: Hsing-Yu Lee, Taoyuan City (TW); Xiang-Biao Tang, Kunshan City (CN); Guang-Yu Wang, Kunshan City (CN)

(73) Assignees: BELLWETHER ELECTRONIC CORP., Taoyuan City (TW); BELLWETHER ELECTRONIC (KUNSHAN) CO., LTD, Kunshan City (CN)

( * ) Notice: Subject to any disclaimer, the term of this patent is extended or adjusted under 35 U.S.C. 154(b) by 366 days.

(21) Appl. No.: 18/655,417

(22) Filed: May 6, 2024

(65) Prior Publication Data

US 2024/0421546 A1 Dec. 19, 2024

Related U.S. Application Data

(60) Provisional application No. 63/472,640, filed on Jun. 13, 2023.

(51) Int. Cl.
*H01R 25/14* (2006.01)
*H01R 4/18* (2006.01)

(52) U.S. Cl.
CPC ........... *H01R 25/142* (2013.01); *H01R 4/183* (2013.01)

(58) Field of Classification Search
CPC .............. H01R 13/5219; H01R 13/183; H01R 13/142; H01R 13/02; H01R 13/113; H01R 13/6582; H01R 12/7088; H01R 12/75
See application file for complete search history.

(56) References Cited

U.S. PATENT DOCUMENTS 11,211,734 B2 * 12/2021 Hung ................. H01R 13/6276
11,705,657 B2 * 7/2023 Hung ..................... H01R 13/18
439/604

(Continued)

FOREIGN PATENT DOCUMENTS

| | | | | |
|---|---|---|---|---|
| EP | 4411998 A1 * | 8/2024 | ......... | H01R 13/6683 |
| KR | 20210094879 A * | 7/2021 | ............. | H01R 4/182 |

OTHER PUBLICATIONS

Machine translation of KR-20210094879-A (Year: 2021).*

*Primary Examiner* — Leah Macchiarolo
(74) *Attorney, Agent, or Firm* — Li & Cai Intellectual Property (USA) Office

(57) ABSTRACT

A busbar connector includes a housing, two terminal sets, and a plurality of cables. The housing includes two upright portions, and the two upright portions are opposite to each other and jointly form the socket. The two terminal sets are inserted into the housing. Each of the terminal sets includes at least one power terminal. The at least one power terminal includes a contact portion, a fixing portion, and a crimping portion. The fixing portion is connected between the contact portion and the crimping portion. The plurality of cables are arranged in a single row, and one end of the plurality of cables is fixedly connected to the crimping portion. The crimping portion has a cross section that is perpendicular to an extending direction of the plurality of cables, and an aspect ratio of the cross section is greater than or equal to 3.

16 Claims, 10 Drawing Sheets

(56) References Cited

U.S. PATENT DOCUMENTS

| | | | | |
|---|---|---|---|---|
| 2003/0171032 | A1 * | 9/2003 | Kobayashi ............. | H01R 12/00<br>174/359 |
| 2004/0185703 | A1 * | 9/2004 | Lee ...................... | H01R 4/2454<br>439/417 |
| 2026/0011948 | A1 * | 1/2026 | Lee ...................... | H01R 13/502 |

* cited by examiner

BUSBAR CONNECTOR AND POWER TERMINAL WITH CABLES

CROSS-REFERENCE TO RELATED PATENT APPLICATION

This application claims the benefit of priority to the U.S. Provisional Patent Application Ser. No. 63/472,640, filed on Jun. 13, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a busbar connector and a power terminal with cables, and more particularly to a busbar connector and a power terminal with cables capable of improving the current carrying capacity.

BACKGROUND OF THE DISCLOSURE

Generally, the heat dissipation effect of busbar connectors which are used to transmit large currents directly affects the current carrying capacity. In the existing busbar connectors, when a power terminal is connected to multiple cables, the exposed copper wires of the multiple cables are stacked in multiple rows and are placed on a crimping portion of the power terminal. However, while the multiple cables are being crimped in multiple rows, a large force needs to be applied to the crimping portion for crimping the exposed copper wires therein, so as to avoid insufficient crimping and causing the cable to fall off. In addition, after crimping, the crimped portions of the power terminal form a cylindrical or ring-cylindrical shape, and there are gaps between the copper wires and between the crimped portion and the copper wires. Therefore, the contact resistance between the power terminal and the cables is not easily reduced, thereby lowering the current carrying capacity of the busbar connectors.

Therefore, how to improve structural design and overcome the above-mentioned inadequacies has become an important issue to be addressed in the relevant art.

SUMMARY OF THE DISCLOSURE

In response to the above-referenced technical inadequacies, the present disclosure provides a busbar connector and a power terminal with cables capable of improving the current carrying capacity.

In order to solve the above-mentioned problems, one of the technical aspects adopted by the present disclosure is to provide a busbar connector, which includes a housing, two terminal sets, and a plurality of cables. The housing includes two upright portions, and the two upright portions are opposite to each other and jointly form the socket. The two terminal sets are inserted into the housing. Each of the terminal sets includes at least one power terminal. The at least one power terminal includes a contact portion, a fixing portion, and a crimping portion. The fixing portion is connected between the contact portion and the crimping portion. The plurality of cables are arranged in a single row, and one end of the plurality of cables is fixedly connected to the crimping portion. The crimping portion has a cross section that is perpendicular to an extending direction of the plurality of cables, and an aspect ratio of the cross section is greater than or equal to 3.

In order to solve the above-mentioned problems, another one of the technical aspects adopted by the present disclosure is to provide a power terminal with cables, which includes a power terminal and at least three cables. The power terminal includes a contact portion, a fixing portion, and a crimping portion. The fixing portion is connected between the contact portion and the crimping portion. The at least three cables are arranged in a single row, and one end of the at least three cables is fixedly connected to the crimping portion. The crimping portion has a cross section that is perpendicular to an extending direction of the at least three cables, and an aspect ratio of the cross section is greater than or equal to 3.

Therefore, in the busbar connector and the power terminal with cables provided by the present disclosure, by virtue of "the plurality of cables being arranged in a single row, and one end of the plurality of cables being fixedly connected to the crimping portion" and "the crimping portion having a cross section that is perpendicular to an extending direction of the plurality of cables, and an aspect ratio of the cross section being greater than or equal to 3," the plurality of cables are connected to the power terminal in a single row arrangement, such that contact areas between the crimp portion of the power terminal and the cables can be increased to reduce contact resistance, and surface areas of each of the cables that are in contact with the air can be increased (i.e., the heat dissipation area are increased), thereby improving heat dissipation efficiency and increasing current carrying capacity.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
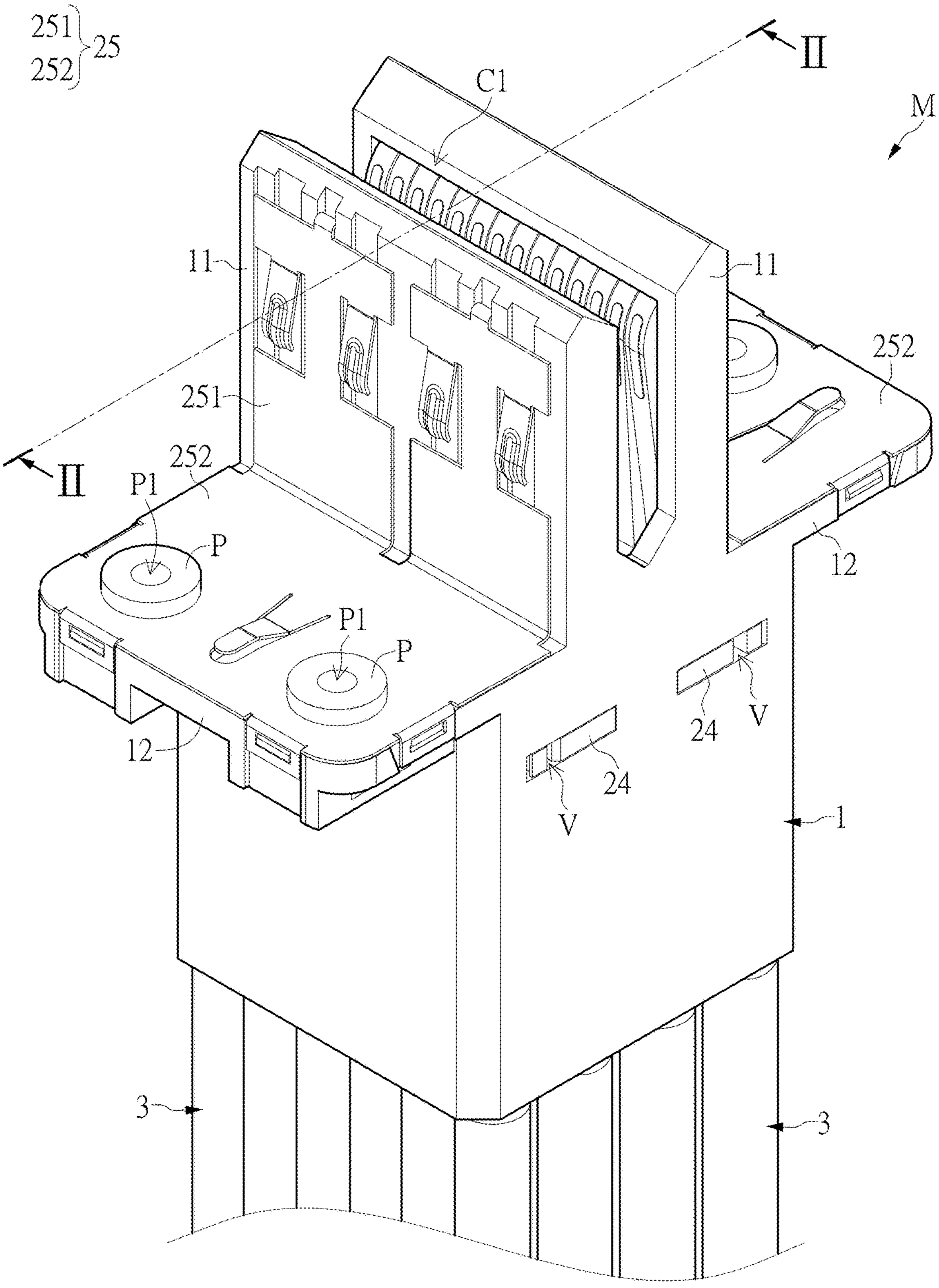
FIG. 1 is a schematic perspective view of a busbar connector according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
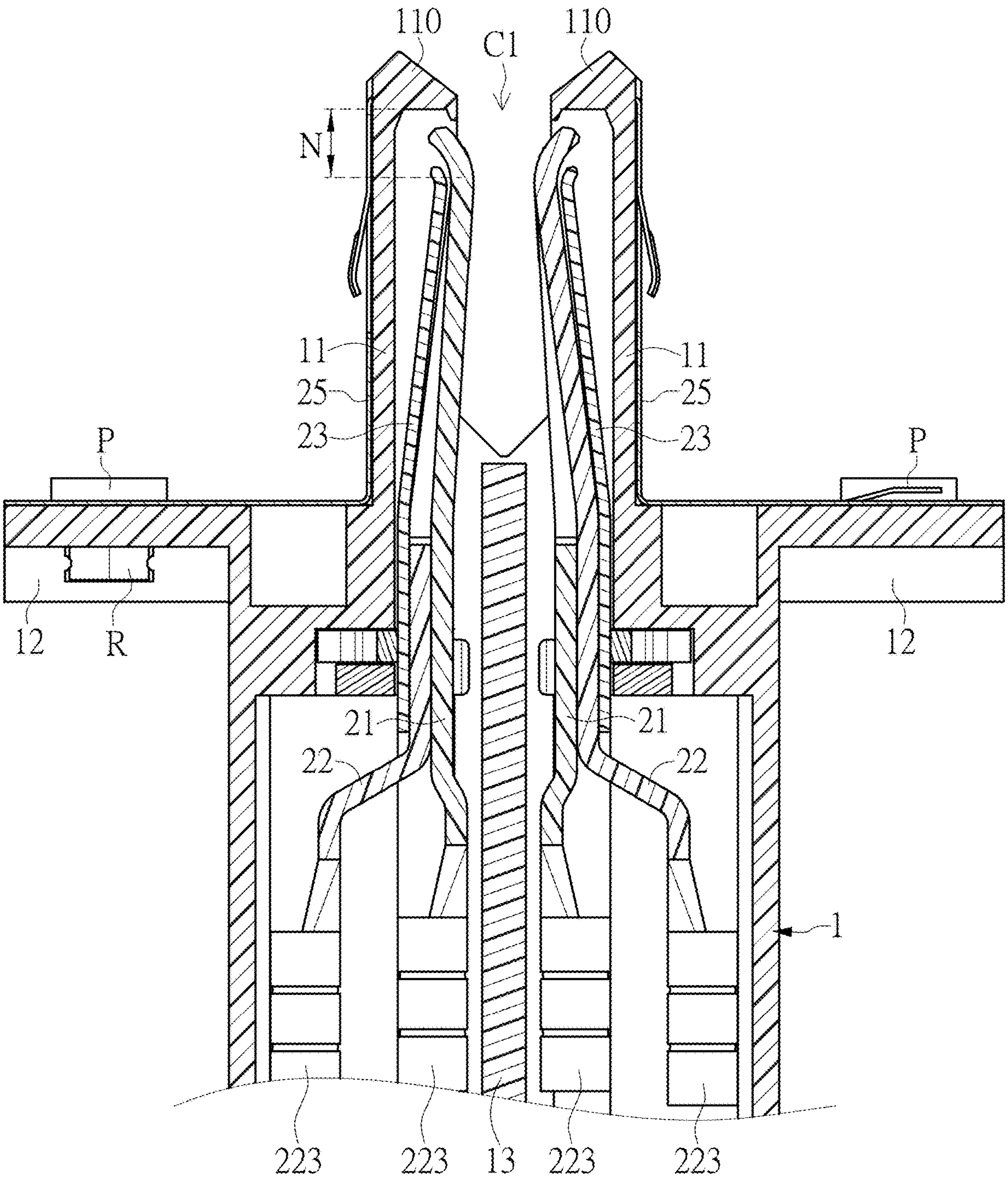
FIG. 2 is a schematic cross-sectional view taken along line II-II of FIG. 1.
Figure 3:
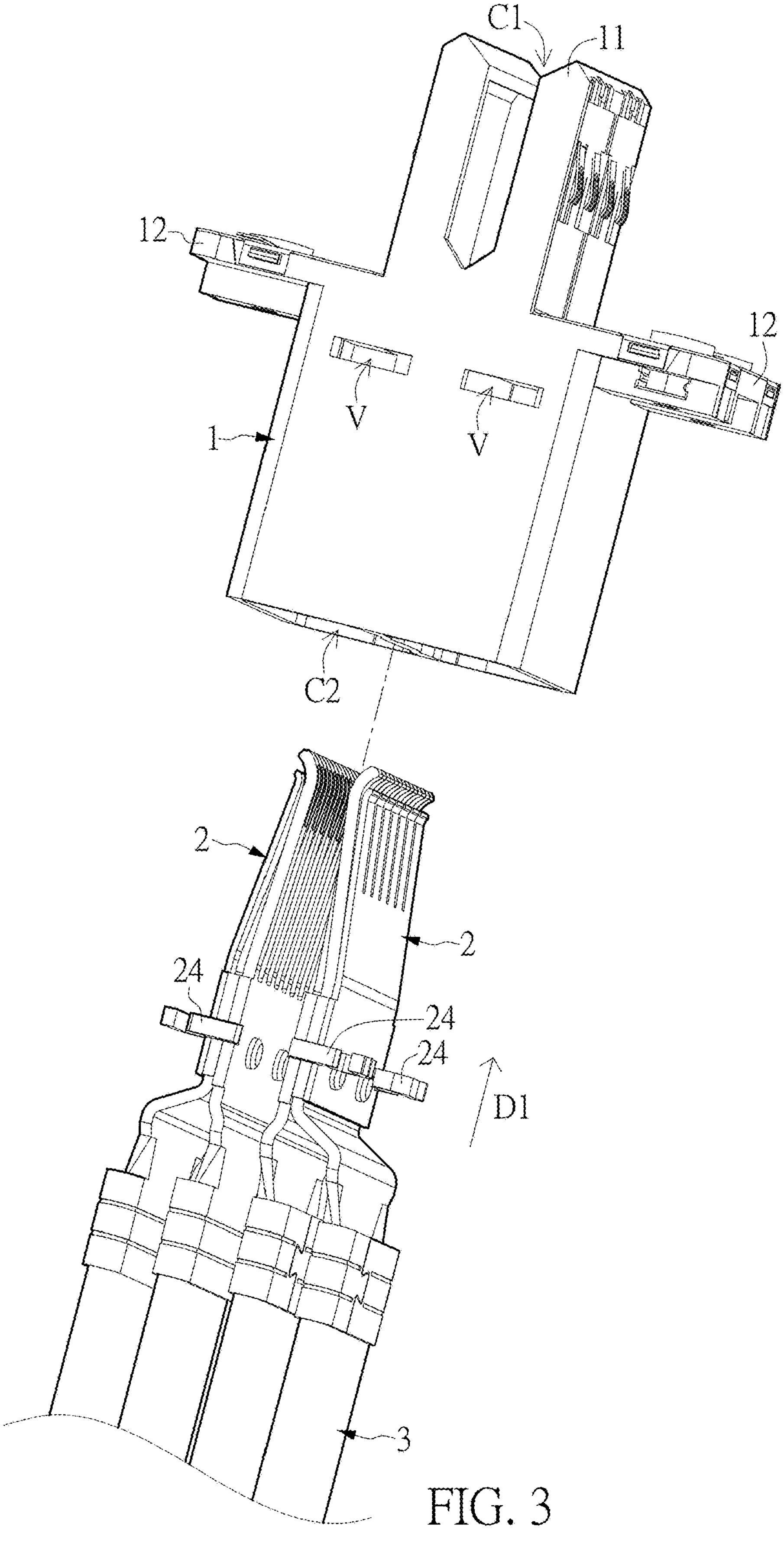
FIG. 3 is a schematic exploded view of a housing and two terminal sets in the busbar connector according to the first embodiment of the present disclosure.

Referring to FIG. 1 to FIG. 3, a first embodiment of the present disclosure provides a busbar connector M, which includes a housing 1, two terminal sets 2, and a plurality of cables 3. The housing 1 is a hollow housing, and the two terminal sets 2 are disposed in the housing 1. Each of the terminal sets 2 includes at least one power terminal that is connected to the plurality of cables 3. The at least one power terminal is used to transmit a large current. In the present disclosure, the plurality of cables 3 are arranged in a single row.

The housing 1 includes two upright portions 11. The two upright portions 11 are opposite to each other and jointly form a socket C1. As shown in FIG. 2, an end portion of each of the upright portions 11 forms a hook-shaped portion 110. The socket C1 is located between the two hook-shaped portions 110. An opening C2 is formed on a side of the housing 1 opposite to the two upright portions 11. The two terminal sets 2 can be inserted into the housing 1 from the opening C2. The housing 1 includes a partition wall 13 therein. The partition wall 13 can be used to electrically isolate the two terminal sets 2, and the two terminal sets 2 are separated from each other and do not electrically contact each other. Accordingly, the busbar connector M provided by the present disclosure can be plugged into an electrical mating connector (not shown in the figures) through the socket C1, so as to receive at least one working voltage.

Figure 6:
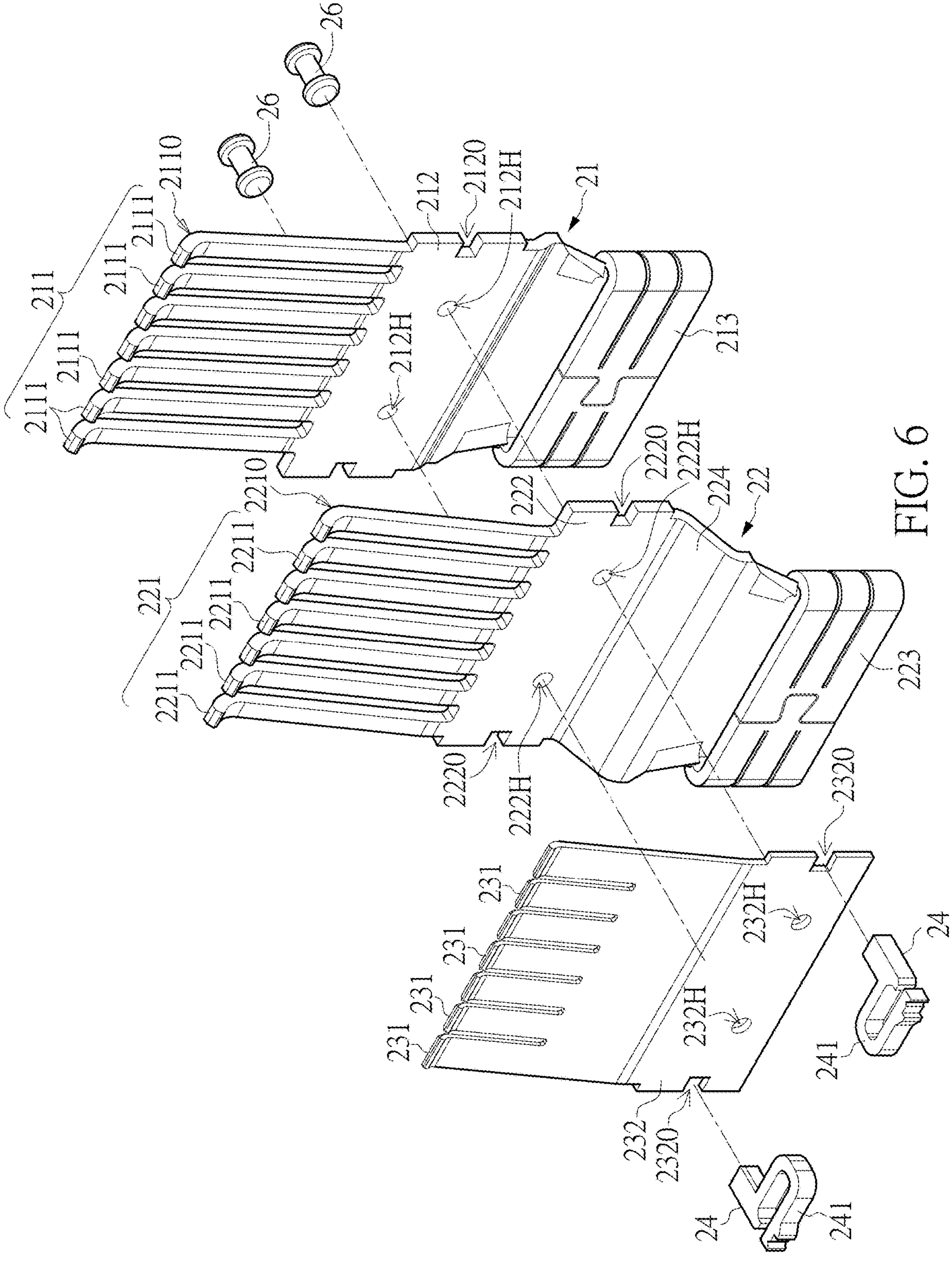
FIG. 6 is a schematic exploded view of the power terminal of the busbar connector according to the first embodiment of the present disclosure.

Each of the terminal sets 2 includes one or more power terminals, and a quantity of the power terminal is not limited in the present disclosure. Referring to FIG. 1 to FIG. 3, each of the terminal sets 2, for example, includes a first power terminal 21 and a second power terminal 22 that are stacked to each other. Referring to FIG. 6, the first power terminal 21 includes a contact portion 211, a fixing portion 212, and a crimping portion 213. The fixing portion 212 forms a plate-like shape, and the fixing portion 212 is connected between the contact portion 211 and the crimping portion 213. Similarly, the second power terminal 22 includes a contact portion 221, a fixing portion 222, and a crimping portion 223. The fixing portion 222 is connected between the contact portion 221 and the crimping portion 223. One end of the plurality of cables 3 is fixedly connected to the crimping portion 223. The fixing portion 212 of the first power terminal 21 and the fixing portion 222 of the second power terminal 22 are electrically connected to each other.

Figure 4:
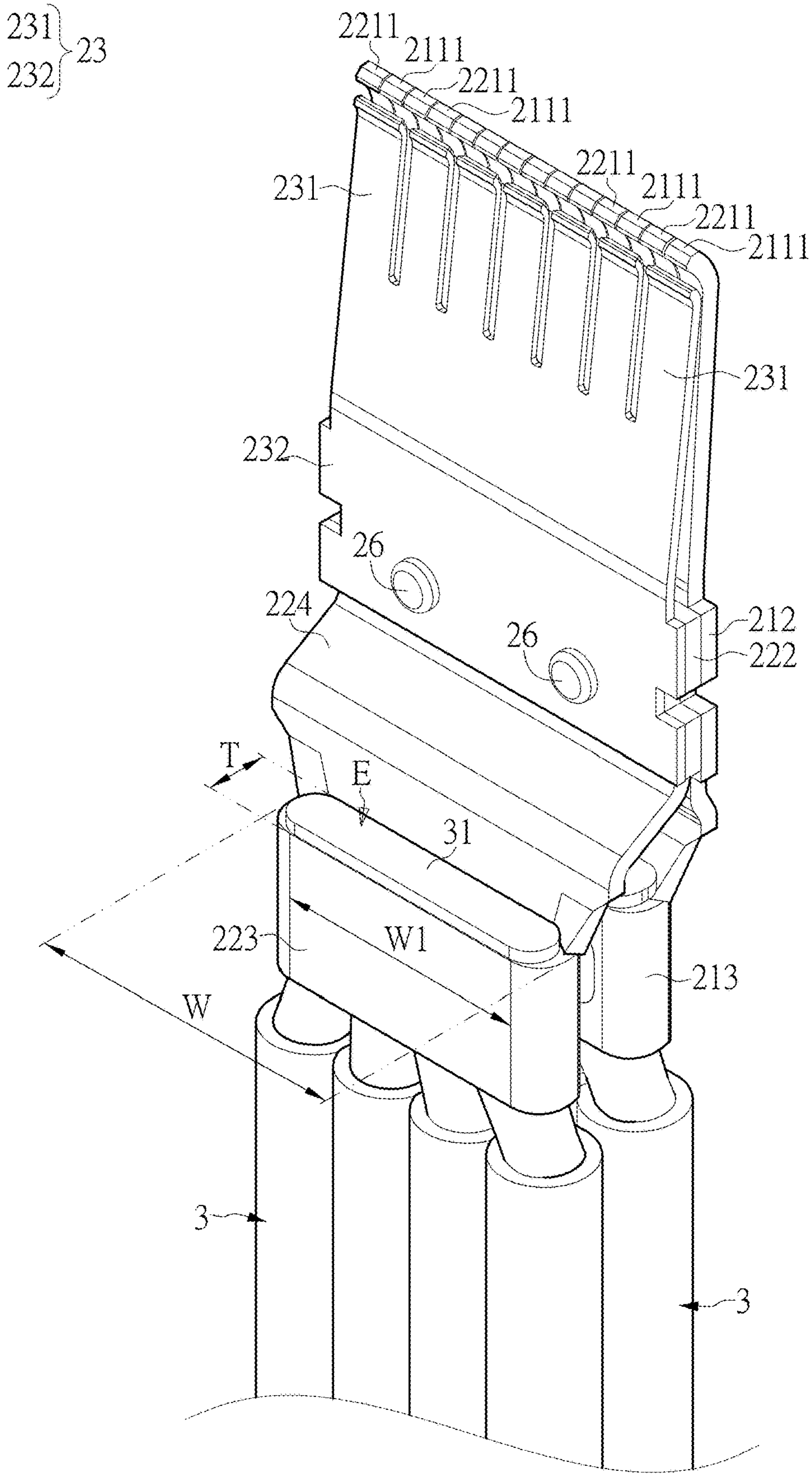
FIG. 4 is a schematic view of a power terminal and cables in the busbar connector according to the first embodiment of the present disclosure.

Referring to FIG. 4, the second power terminal 22 further includes a bending portion 224 that is connected between the fixing portion 222 and the crimping portion 223. Through structural design of the bending portion 224, when the first power terminal 21 and the second power terminal 22 are stacked to each other, the crimping portion 213 of the first power terminal 21 and the crimping portion 223 of the second power terminal 22 are spaced apart from each other and do not contact each other, thereby increasing the airflow space and improving heat dissipation efficiency.

Referring to FIGS. 3 and 4, one end of the plurality of cables 3 is a conductive portion 31, which is fixedly connected to the crimping portion 213 of the first power terminal 21 and the crimping portion 223 of the second power terminal 22. The plurality of cables 3 are arranged in a single row of 1×N, where N is the number of the cables 3 connected to one of the crimping portions 213 and 223. Due to the arrangement and crimping way of the cables 3, at least part of the front and rear sides of the crimping portions 213 and 223 form flat shapes (e.g., flat plate areas), the left and right sides of the crimping portions 213 and 223 are form arc shapes, and the crimping portions 213 and 223 extend from a side of the fixing portions 212 and 222 and protrude outward. Specifically, the contact portions 211 and 221 and the crimping portions 213 and 223 are protrudingly provided on opposite sides of the fixing portions 212 and 222. Taking the crimping portion 223 as an example for illustration, the crimping portion 223 has a thickness T and a width W. Viewed along an extending direction D1 parallel to the plurality of cables 3, the crimping portion 223 has a cross section E that is perpendicular to the extending direction D1 of the plurality of cables 3, and an aspect ratio of the cross section E is greater than or equal to 3. A length of the cross section E is the width W of the crimping portion 223, and a width of the cross section E is the thickness T of the crimping portion 223. In other words, the crimping portion of each of the power terminals crimps at least three cables, and these cables are arranged in a single row. Taking the crimping portion 223 in FIG. 4 as an example for illustration, a ratio of a lateral width W1 of each of the flat plate areas on the front and rear sides of the crimping portion 223 to a distance between the two flat plate areas (i.e., the thickness T) is greater than or equal to 2.

Figure 5:
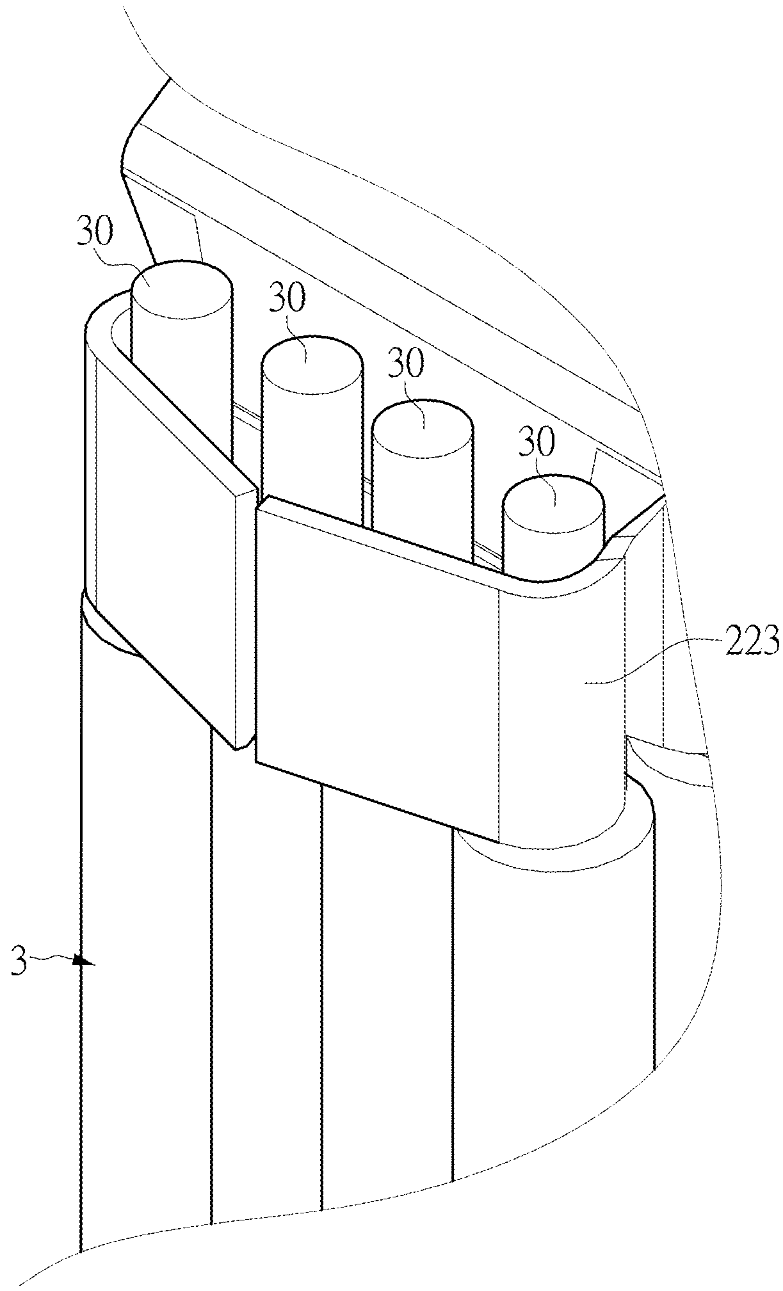
FIG. 5 is a schematic view of a crimping portion of the power terminal not crimping the cables in the busbar connector according to the first embodiment of the present disclosure.

Each of the cables 3 is a plurality of conductors covered with an insulating sheath, and one ends of the conductors are not covered by the insulating sheath and are exposed as a plurality of conductive wires 30. Referring to FIG. 4 and FIG. 5, FIG. 4 shows an implementation in which the conductive wires 30 of the plurality of cables 3 are crimped to form the conductive portion 31, and FIG. 5 shows an implementation when the conductive wires 30 of the plurality of cables 3 have not been crimped (before crimping). Crimping is a process in which the conductive wires are placed in the crimping portion of the terminal and are applied by a pressure to form a closed barrel crimp to achieve a tight connection. Through the way of crimping, the multiple exposed conductive wires 30 of the plurality of cables 3 shown in FIG. 5 are pressed and formed to the conductive portion 31 shown in FIG. 4. In addition, the conductive portion 31 can be filled by a solder therein, and the solder can fill gaps in the conductive portion 31 (i.e., gaps between the conductive wires 30 of the cables 3, and between the conductive wires 30 and the crimping portion) by heating, so as to further reduce the contact resistance between the cables 3 and the power terminal.

Referring to FIG. 2 and FIG. 6, the contact portion 211 of the first power terminal 21 includes a plurality of first contact arms 2111, which extend from one side of the fixing portion 212 toward the upright portion 11 and are bent inward. The contact portion 221 of the second power terminal 22 includes a plurality of second contact arms 2211, which extend from one side of the fixing portion 222 toward the upright portion 11 and are bent inward. The plurality of first contact arms 2111 and the plurality of second contact arms 2211 are staggeringly arranged in a row. Each of the first contact arms 2111 has a contact surface 2110, and each of the second contact arms 2211 has a contact surface 2210. The contact surfaces 2110 of the first contact arms 2111 and the contact surfaces 2210 of the second contact arms 2211 can be arranged in a same row in a plugging direction. Alternatively, the contact surfaces 2110 of the first contact arms 2111 and the contact surfaces 2210 of the second contact arms 2211 can be arranged in different rows in the plugging direction to form a staggered arrangement, so as to reduce an insertion force required for the electrical mating connector. When the electrical mating connector is plugged into the busbar connector M through the socket C1, the plurality of first contact arms 2111 and the plurality of second contact arms 2211 electrically contact the conductive terminals in the electrical mating connector through the plurality of contact surfaces 2110 and 2210 for current transmission. In addition, through the staggered arrangement of the plurality of first contact arms 2111 and the plurality of second contact arms 2211, quantities of electrical contact points can be increased to enhance the conductive areas as much as possible, thereby reducing contact resistance.

Referring to FIGS. 4 and 6, each of the terminal sets 2 further includes a support terminal 23. The support terminal 23 is stacked with the first power terminal 21 and the second power terminal 22. The second power terminal 22 is stacked between the first power terminal 21 and the support terminal 23, and the support terminal 23 is located on the outermost side of each of the terminal sets 2. That is, as shown in FIG. 2, the support terminal 23 is farther from the partition wall 13 than the first and second power terminals 21 and 22. The support terminal 23 includes a fixing portion 232 and a plurality of support arms 231 that are connected to the fixing portion 232. As shown in FIG. 4, each of the support arms 231 corresponds to and overlaps with the adjacent one of the first contact arms 2111 and the adjacent one of the second contact arms 2211. The support terminal 23 can be made of, for example, stainless steel material with better elasticity. Thereby, the plurality of support arms 231 can provide a strong normal force to the first contact arms 2111 of the first power terminal 21 and the second contact arms 2211 of the second power terminal 22, such that the first contact arms 2111 and the second contact arms 2211 can more firmly contact the conductive terminals of the electrical mating connector.

Each of the terminal sets further includes a snap-fitting member 24. A slot 2120 is formed on one side of the fixing portion 212 of the first power terminal 21. A slot 2220 is formed on one side of the fixing portion 222 of the second power terminal 22. A slot 2320 is formed on one side of the fixing portion 232 of the support terminal 23. When the support terminal 23, the first power terminal 21, and the second power terminal 22 are stacked to each other, the slots 2120, 2220, and 2320 are also stacked to each other. Furthermore, the snap-fitting member 24 is snapped into the slots 2120, 2220, and 2320. A quantity of the snap-fitting member 24 is not limited in the present disclosure. As shown in FIG. 6, each of the terminal sets 2 includes two snap-fitting members 24. Similarly, each of the power terminals can include two slots, correspondingly. The two slots are disposed at two sides of the fixing portion, respectively.

Moreover, the snap-fitting member 24 includes a U-shaped beam 241. The housing 1 includes a fastening hole V. When each of the terminal sets 2 is inserted into the housing 1, the U-shaped beam 241 is snapped on the fastening hole V. Therefore, the first power terminal 21, the second power terminal 22, and the support terminal 23 can be locked up through the snap-fitting member 24, and fixed in the housing 1 to prevent the terminal set 2 from being detached from the housing 1.

Each of the terminal sets 2 further includes a plurality of fixing pins 26. The fixing portion 212 of the first power terminal 21 has a plurality of through holes 212H corresponding to the plurality of fixing pins 26. The fixing portion 222 of the second power terminal 22 has a plurality of through holes 222H corresponding to the plurality of fixing pins 26. The fixing portion 232 of the support terminal 23 has a plurality of through holes 232H corresponding to the plurality of fixing pins 26. Therefore, each of the fixing pins 26 passes through the plurality of through holes 212H, 222H, and 232H to connect the first power terminal 21, the second power terminal 22, and the support terminal 23 together.

Figure 7:
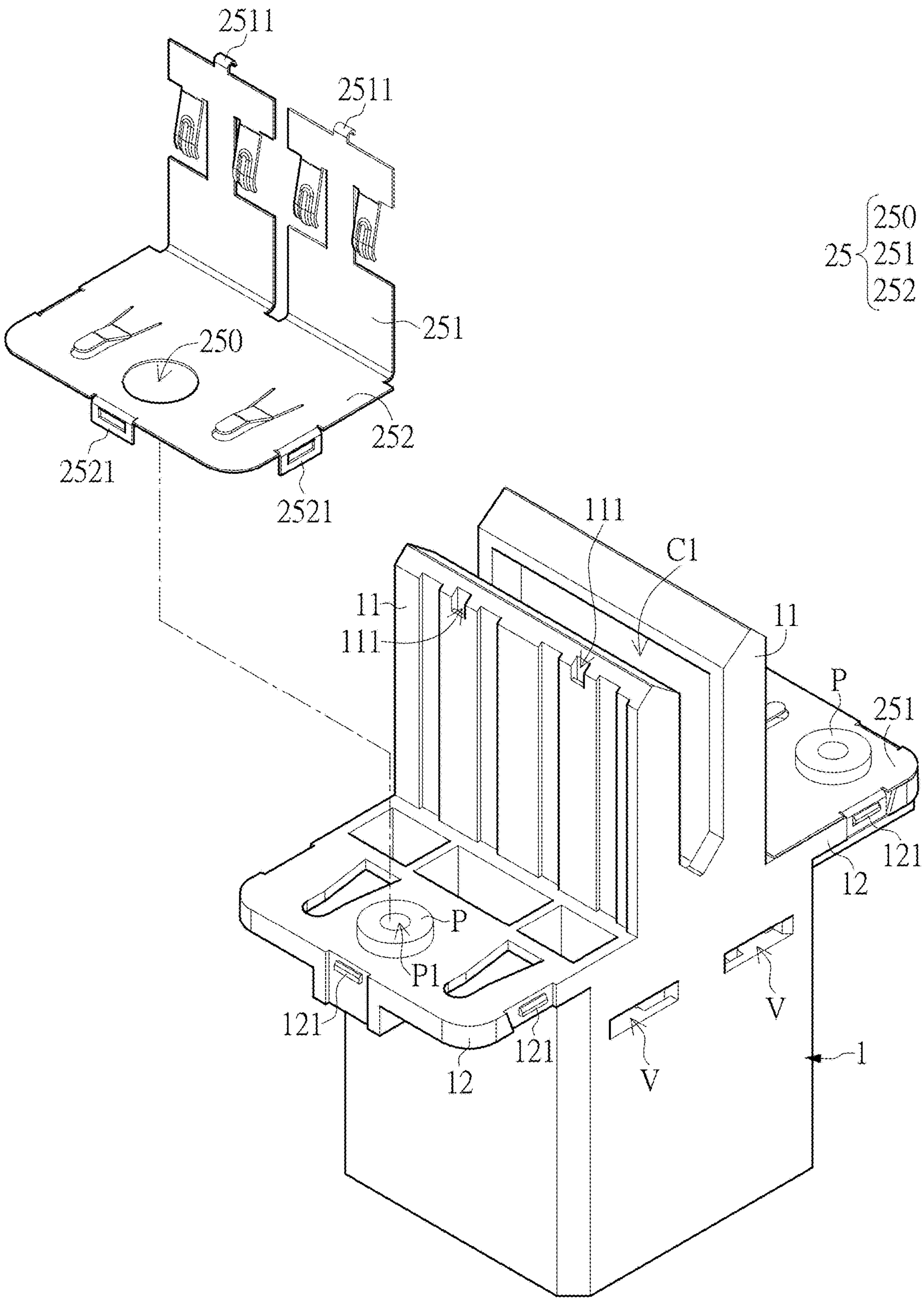
FIG. 7 is a schematic exploded view of the housing and grounding terminal of the busbar connector according to the first embodiment of the present disclosure.

Referring to FIG. 7, each of the terminal sets 2 further includes two grounding terminals 25, which are respectively disposed at and exposed from two sides of the housing 1. Each of the grounding terminals 25 includes a first section 251 and a second section 252 that are perpendicular to each other. An edge of the first section 251 has a plurality of first engaging members 2511, and an edge of the second section 252 has a plurality of second engaging members 2521. The grounding terminal 25 can first contact the electrical mating connector when the busbar connector M is plugged into the electrical mating connector, and the static electricity conducted from the electrical mating connector to the busbar connector M is guided to ground.

The housing 1 further includes two wing portions 12, which respectively correspond to the two upright portions 11. Each of the wing portions 12 is perpendicular to a corresponding one of the upright portions 11. The housing 1 has a plurality of first fastener portions 111 respectively corresponding to the plurality of first engaging members 2511 at a top edge of each of the upright portions 11, and the housing 1 has a plurality of second fastener portions 121 respectively corresponding to the plurality of second engaging members 2521 at an edge of each of the wing portions 12.

When the two grounding terminals 25 are respectively disposed at the two sides of the housing 1, the two first sections 251 of the two grounding terminals 25 are respectively disposed at the two upright portions 11, such that the plurality of first engaging members 2511 are respectively snapped on the plurality of first fastener portions 111, and the plurality of second engaging members 2521 are respectively snapped on the plurality of second fastener portions 121, so as to fix the two grounding terminals 25 on the housing 1.

For example, each of the first engaging members 2511 is a hook, and each of the first fastener portions 111 is a slot. Each of the second engaging members 2521 is a perforated fixing piece, and each of the second fastener portions 121 is a protruding rib. In addition, the second section 252 of each of the grounding terminals 25 includes at least one locking hole 250, and each of the wing portions 12 of the housing 1 includes at least one positioning pad P corresponding to the at least one locking hole 250. When each of the grounding terminals 25 is disposed on the housing 1, the at least one locking hole 250 is snapped on the at least one positioning pad P. As shown in FIG. 2, a nut R is provided with each of the wing portions 12 (FIG. 2 only shows the nut R in one of the wing portions 12), and the at least one positioning pad P has a screw hole P1 corresponding to the nut R. Therefore, the housing 1 can be fixed to a fixing frame by passing a screw (not shown in the figures) through the screw hole P1 and being combined with the nut R.

Second Embodiment

Figure 8:
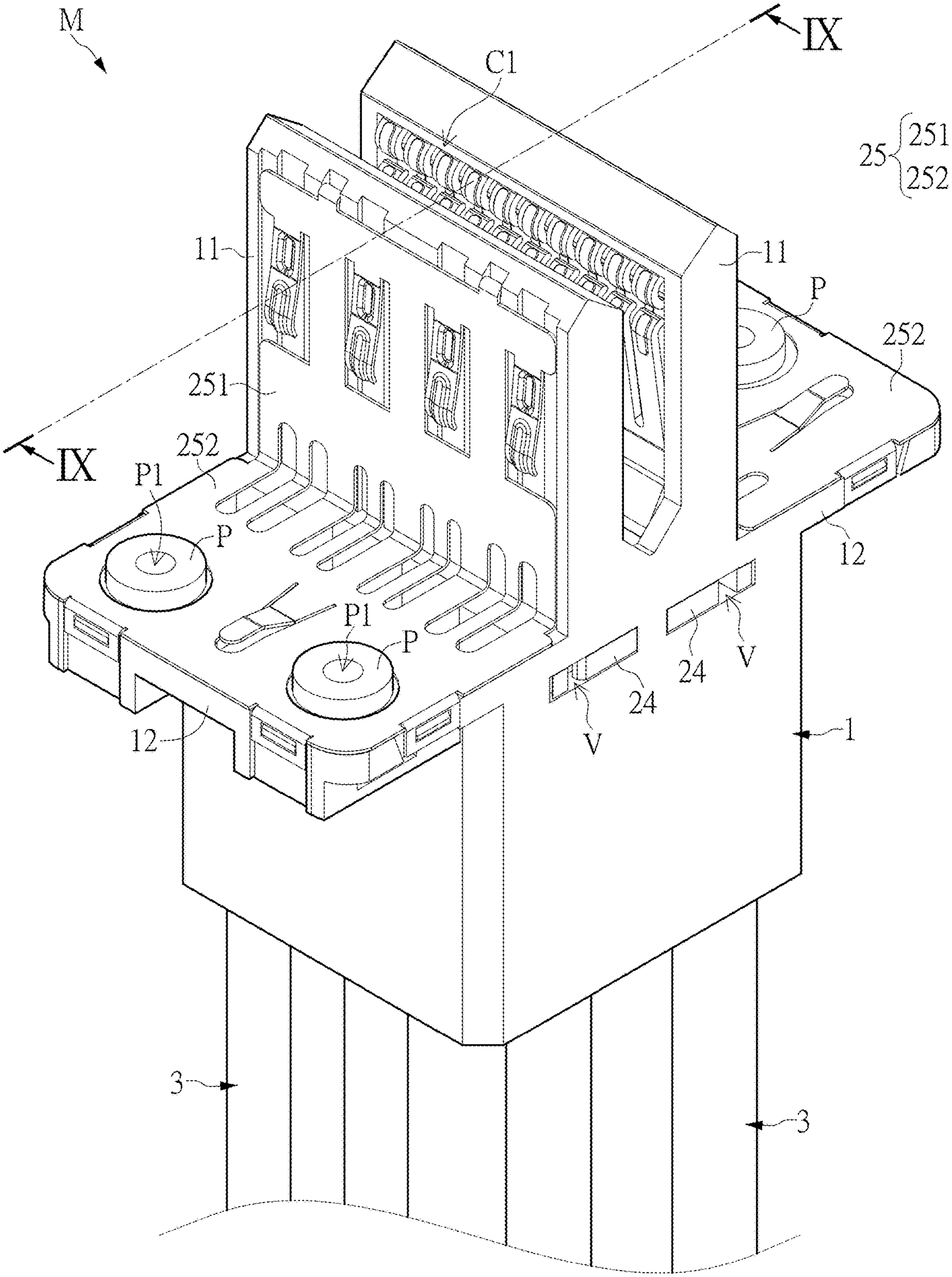
FIG. 8 is a schematic perspective view of a busbar connector according to a second embodiment of the present disclosure.
Figure 9:
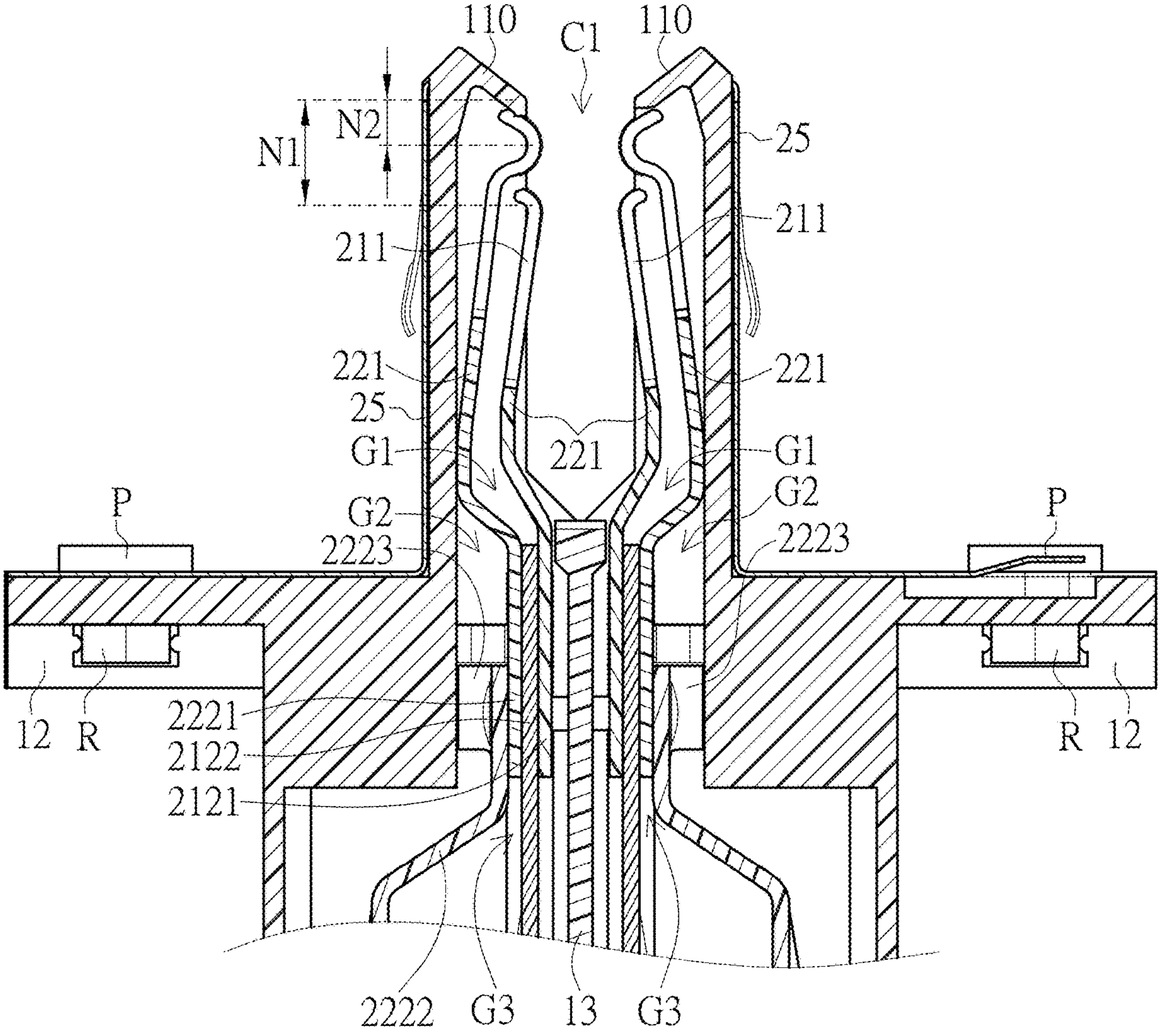
FIG. 9 is a schematic cross-sectional view taken along line IX-IX of FIG. 8.
Figure 10:
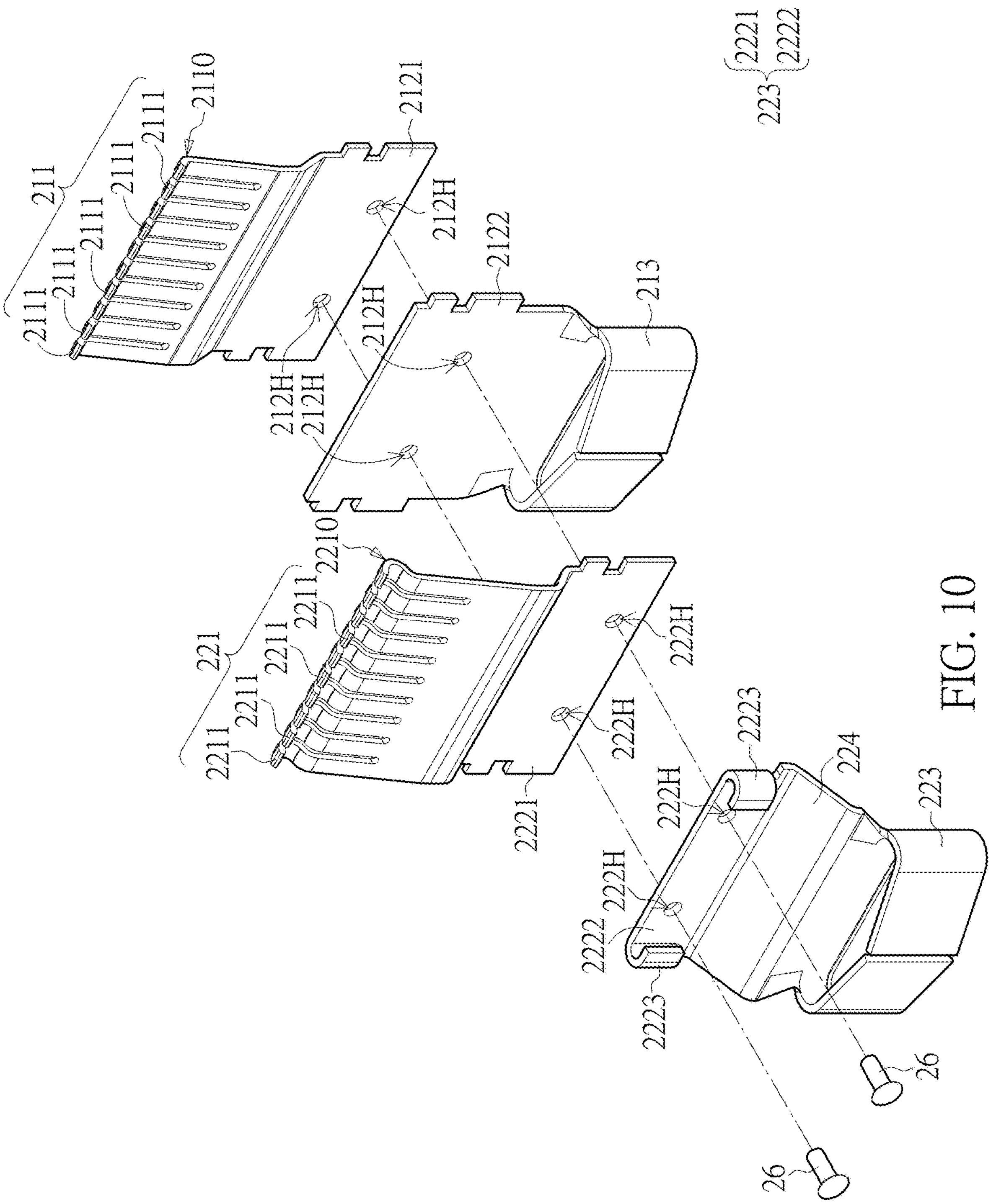
FIG. 10 is a schematic exploded view of the power terminal of the busbar connector according to the second embodiment of the present disclosure.

Referring to FIG. 8 to FIG. 10, a second embodiment of the present disclosure provides a busbar connector M. The busbar connector M of the second embodiment has a structure similar to that of the first embodiment, and the similarities therebetween will not be reiterated herein. The main difference between the second embodiment and the first embodiment is as follows: the power terminal of the busbar connector M of the second embodiment is different from that of the first embodiment. The plurality of first contact arms 2111 of the first power terminal 21 and the plurality of second contact arms 2211 of the second power terminal 22 are aligned one after the other and separated from each other by a fixed gap. As shown in FIGS. 9 and 10, contact areas formed by the plurality of contact surfaces 2110 of the plurality of first contact arms 2111 are separated from the socket C1 by a distance N1, contact areas formed by the plurality of contact surfaces 2210 of the plurality of second contact arms 2211 are separated from the socket C1 by another distance N2, and the distance N1 is greater than the distance N2. In other words, the contact areas formed by the plurality of contact surfaces 2210 of the plurality of second contact arms 2211 are closer to a front end of the socket C1 than the contact areas formed by the plurality of contact surfaces 2110 of the plurality of first contact arms 2111. When the busbar connector M is docked to the external electrical mating connector, the electrical mating connector contacts the plurality of contact surfaces 2210 of the plurality of second contact arms 2211, and then contacts the plurality of contact surfaces 2110 of the plurality of first contact arms 2111. Through the design of the first contact arms 2111 and the second contact arms 2211 being aligned one after the other and separated from each other by the fixed gap, the insertion force required for docking the electrical mating connector to the busbar connector M can be reduced.

Moreover, the fixing portion 212 of the first power terminal 21 includes a first fixing section 2121 and a second fixing section 2122 that are separable from each other. The first fixing section 2121 is connected to the contact portion 211, the second fixing section 2122 is connected to the crimping portion 213, and the first fixing section 2121 can be connected to the second fixing section 2122 through the fixing pins 26. Similarly, the fixing portion 222 of the second power terminal 22 includes a first fixing section 2221 and a second fixing section 2222 that are separable from each other. The first fixing section 2221 is connected to the contact portion 221, and the second fixing section 2222 is connected to the crimping portion 223. In other words, in the second embodiment, each of the power terminals can be divided into a plurality of parts. In addition, in the second embodiment, the power terminals have no support terminals.

Moreover, the first fixing section 2121 and the second fixing section 2122 of the first power terminal 21 have a plurality of through holes 212H, and the first fixing section 2221 and the second fixing section 2222 of the second power terminal 22 have a plurality of through holes 222H. The first power terminal 21 and the second power terminal 22 are assembled through the plurality of fixing pins 26 passing through the plurality of through holes 212H and 222H.

As shown in FIG. 10, the fixing portion 222 of the second power terminal 22 further includes two limiting portions 2223, the two limiting portions 2223 are respectively connected to two sides of the second fixing section 2222, and each of the limiting portions 2223 forms a bent shape. As shown in FIG. 9, through structural design of the limiting portions 2223, the two limiting portions 2223 abut against an inner wall of the housing 1 when the second power terminal 22 is inserted into the housing 1, such that the second power terminal 22 and the inner wall of the housing 1 form a gap G2 therebetween. In addition, as shown in FIG. 9, the contact portion 211 of the first power terminal 21 and the contact portion 221 of the second power terminal 22 form a gap G1 therebetween, and the second fixing section 2122 of the first power terminal 21 and the bending portion 224 of the second power terminal 22 form a gap G3 therebetween. These gaps G1, G2, and G3 form a heat dissipation channel inside the housing 1, which can be used as a flow path for conduction material such as air or liquid to improve the heat dissipation effect.

Beneficial Effects of the Embodiments

In the busbar connector and the power terminal with cables provided by the present disclosure, by virtue of "the plurality of cables being arranged in a single row, and one end of the plurality of cables being fixedly connected to the crimping portion" and "the crimping portion having a cross section that is perpendicular to an extending direction of the plurality of cables, and an aspect ratio of the cross section being greater than or equal to 3," the plurality of cables are connected to the power terminal in a single row arrangement, such that contact areas between the crimp portion of the power terminal and the cables can be increased to reduce contact resistance, and surface areas of each of the cables in contact with the air can be increased (i.e., the heat dissipation area are increased), thereby improving heat dissipation efficiency and increasing current carrying capacity.

Moreover, in the present disclosure, the plurality of power terminals (i.e., the first power terminal 21 and the second power terminal 22) are connected to the plurality of cables. Each of the power terminals is connected to the plurality of cables arranged in a single row. The crimping portions of the power terminals are spaced apart from and not in contact with each other, so as to increase the airflow space and improving heat dissipation efficiency and current carrying capacity. In addition, through the staggered arrangement of the plurality of first contact arms 2111 of the first power terminal 21 and the plurality of second contact arms 2211 of the second power terminal 22, the quantities of electrical contact points can be increased to enhance the conductive areas as much as possible, thereby reducing contact resistance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A busbar connector, comprising:

a housing having a socket;

two terminal sets inserted into the housing, wherein each of the terminal sets includes at least one power terminal, the at least one power terminal includes a contact portion, a fixing portion, and a crimping portion, and the fixing portion is connected between the contact portion and the crimping portion; and a plurality of cables arranged in a single row, wherein one end of the plurality of cables is fixedly connected to the crimping portion;

wherein the crimping portion has a cross section that is perpendicular to an extending direction of the plurality of cables, and an aspect ratio of the cross section is greater than or equal to 3.

2. The busbar connector according to claim 1, wherein the crimping portion of each of the terminal sets is connected to at least three of the cables.

3. The busbar connector according to claim 1, wherein the at least one power terminal includes a first power terminal and a second power terminal that are stacked with each other, the second power terminal includes a bending portion, the bending portion is connected between the fixing portion and the crimping portion, and the crimping portion of the first power terminal and the crimping portion of the second power terminal are not in contact with each other.

4. The busbar connector according to claim 3, wherein the contact portion of the first power terminal includes a plurality of first contact arms, the contact portion of the second power terminal includes a plurality of second contact arms, the plurality of first contact arms and the plurality of second contact arms are staggeringly arranged in a row, and contact areas of the plurality of first contact arms and the plurality of second contact arms are arranged in a row.

5. The busbar connector according to claim 4, wherein each of the terminal sets further includes a support terminal that is stacked with the first power terminal and the second power terminal, the second power terminal is stacked between the first power terminal and the support terminal, the support terminal includes a plurality of support arms, and each of the support arms overlaps with an adjacent one of the first contact arms and an adjacent one of the second contact arms.

6. The busbar connector according to claim 3, wherein the contact portion of the first power terminal includes a plurality of first contact arms, the contact portion of the second power terminal includes a plurality of second contact arms, the plurality of first contact arms and the plurality of second contact arms are aligned one after another, and contact areas of the plurality of first contact arms are closer to a front end of the socket than contact areas of the plurality of second contact arms.

7. The busbar connector according to claim 3, wherein the fixing portion of the second power terminal includes two limiting portions, the two limiting portions are respectively connected to two sides of the fixing portion, and each of the limiting portions forms a bent shape.

8. The busbar connector according to claim 1, wherein each of the terminal sets further includes a snap-fitting member, the fixing portion of the at least one power terminal includes a slot, and the snap-fitting member is snapped into the slot.

9. The busbar connector according to claim 8, wherein the snap-fitting member includes a U-shaped beam, and the housing includes a fastening hole; wherein, when each of the terminal sets is inserted into the housing, the U-shaped beam is snapped on the fastening hole.

10. The busbar connector according to claim 1, wherein each of the terminal sets further includes two grounding terminals, the two grounding terminals are respectively disposed at and exposed from two sides of the housing, each of the grounding terminals includes a first section and a second section that are perpendicular to each other, an edge of the first section includes a hook, and an edge of the second section includes a perforated fixing piece.

11. The busbar connector according to claim 10, wherein the housing further includes two upright portions and two wing portions, the two upright portions are opposite to each other and jointly form the socket, the two wing portions respectively correspond to the two upright portions, each of the wing portions is perpendicular to a corresponding one of the upright portions, the housing includes a slot corresponding to the hook at an edge of each of the upright portions, and the housing includes a protruding rib corresponding to the perforated fixing piece at an edge of each of the wing portions.

12. The busbar connector according to claim 1, wherein the housing includes a partition wall therein, the partition wall is used to isolate the two terminal sets, such that the two terminal sets are separated from and not in electrical contact with each other.

13. A power terminal with cables, comprising:

a power terminal including a contact portion, a fixing portion, and a crimping portion, wherein the fixing portion is connected between the contact portion and the crimping portion; and at least three cables arranged in a single row, wherein one end of the at least three cables is fixedly connected to the crimping portion;

wherein the crimping portion has a cross section that is perpendicular to an extending direction of the at least three cables, and an aspect ratio of the cross section is greater than or equal to 3.

14. The power terminal with cables according to claim 13, wherein two sides of the crimping portion respectively includes two flat plate areas, and a ratio of a lateral width of each of the flat plate areas to a distance between the two flat plate areas is greater than or equal to 2.

15. The power terminal with cables according to claim 13, wherein the contact portion includes a plurality of contact arms.

16. The power terminal with cables according to claim 13, wherein a solder is filled between the crimping portion and the at least three cables.

* * * * *